(12) United States Patent
Mayerle et al.

(10) Patent No.: US 11,551,187 B2
(45) Date of Patent: Jan. 10, 2023

(54) MACHINE-LEARNING CREATION OF JOB POSTING CONTENT

(71) Applicant: SAP SE, Walldorf (DE)

(72) Inventors: Jochen Mayerle, Flein (DE); Udo Klein, Nussloch (DE); Vladislav Bezrukov, Walldorf (DE)

(73) Assignee: SAP SE, Walldorf (DE)

( * ) Notice: Subject to any disclaimer, the term of this patent is extended or adjusted under 35 U.S.C. 154(b) by 595 days.

(21) Appl. No.: 16/689,434

(22) Filed: Nov. 20, 2019

(65) Prior Publication Data

US 2021/0150484 A1 May 20, 2021

(51) Int. Cl.
*G06Q 10/10* (2012.01)
*G06N 5/04* (2006.01)
*G06N 20/00* (2019.01)

(52) U.S. Cl.
CPC ........... *G06Q 10/1053* (2013.01); *G06N 5/04* (2013.01); *G06N 20/00* (2019.01)

(58) Field of Classification Search
CPC ....... G06N 5/04; G06N 20/00; G06Q 10/1053
See application file for complete search history.

(56) References Cited

U.S. PATENT DOCUMENTS

| | | | | |
|---|---|---|---|---|
| 10,303,681 | B2 * | 5/2019 | Noh | G06F 16/242 |
| 11,373,146 | B1 * | 6/2022 | Yerastov | G06F 40/20 |
| 2015/0317753 | A1 * | 11/2015 | Goel | G06Q 10/1053 |
| | | | | 705/319 |
| 2017/0004450 | A1 * | 1/2017 | Rathod | G06Q 10/1053 |
| 2017/0286914 | A1 * | 10/2017 | Fang | G06N 20/00 |
| 2017/0316514 | A1 * | 11/2017 | Huang | G06N 7/005 |
| 2018/0253694 | A1 * | 9/2018 | Kenthapadi | G06Q 10/1053 |
| 2018/0253695 | A1 * | 9/2018 | Kenthapadi | G06Q 10/1053 |
| 2018/0253696 | A1 * | 9/2018 | Kenthapadi | G06Q 50/01 |
| 2018/0276592 | A1 * | 9/2018 | Amesti | G06Q 10/1053 |
| 2018/0322464 | A1 * | 11/2018 | Pattabiraman | G06Q 50/01 |
| 2019/0080249 | A1 * | 3/2019 | Yang | G06Q 50/01 |
| 2019/0220824 | A1 * | 7/2019 | Liu | G06Q 10/1053 |
| 2019/0303835 | A1 * | 10/2019 | Saha | G06Q 10/06311 |
| 2020/0065772 | A1 * | 2/2020 | Whitehead | G06Q 10/1053 |
| 2020/0126022 | A1 * | 4/2020 | Gaspar | G06Q 10/1053 |
| 2020/0151586 | A1 * | 5/2020 | Yuan | G06Q 10/105 |
| 2020/0151647 | A1 * | 5/2020 | Kathalagiri Somashekariah | |
| | | | | G06N 20/00 |
| 2020/0151672 | A1 * | 5/2020 | Xue | G06N 5/04 |

(Continued)

OTHER PUBLICATIONS

T.C. Sandanayake et al. Automated CV Analyzing and Ranking Tool to Select Candidates for Job Positions, ICIT 2018, Dec. 29-31, 2018, Hong Kong, Hong Kong, 6 pages. (Year: 2018).*

*Primary Examiner* — George C Neurauter, Jr.
(74) *Attorney, Agent, or Firm* — Buckley, Maschoff & Talwalkar LLC

(57) ABSTRACT

Provided is a system and method for generating job posting content through machine learning. In one example, the method may include storing text content of previous postings, receiving target attributes of a candidate that is a subject of a new posting, identifying, via a machine learning model, a subset of previous postings from among the previous postings which are most closely related to the new posting based on the target attributes of the candidate with respect to content of the previous postings, and detecting text objects from the identified subset of previous postings and outputting a display of the detected text objects.

20 Claims, 7 Drawing Sheets

(56) References Cited

U.S. PATENT DOCUMENTS

| | | | |
|---|---|---|---|
| 2021/0012267 A1* | 1/2021 | Fawaz | G06Q 10/063112 |
| 2021/0081900 A1* | 3/2021 | Wang | G06N 5/04 |
| 2021/0089603 A1* | 3/2021 | Abbasi Moghaddam | G06N 20/00 |
| 2021/0319334 A1* | 10/2021 | Mitchell | G06N 5/04 |

* cited by examiner

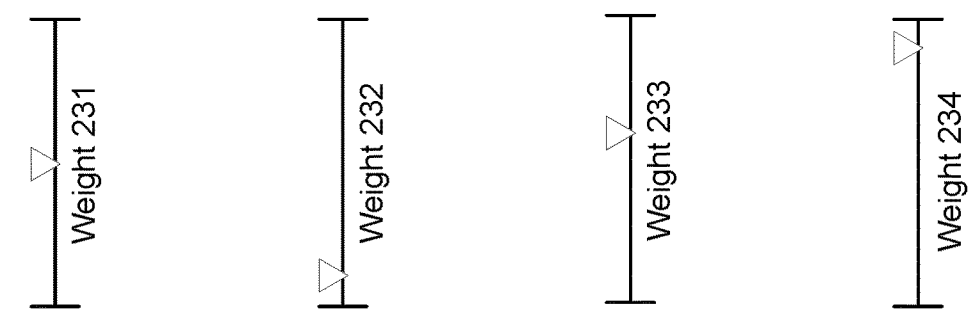
FIG. 2

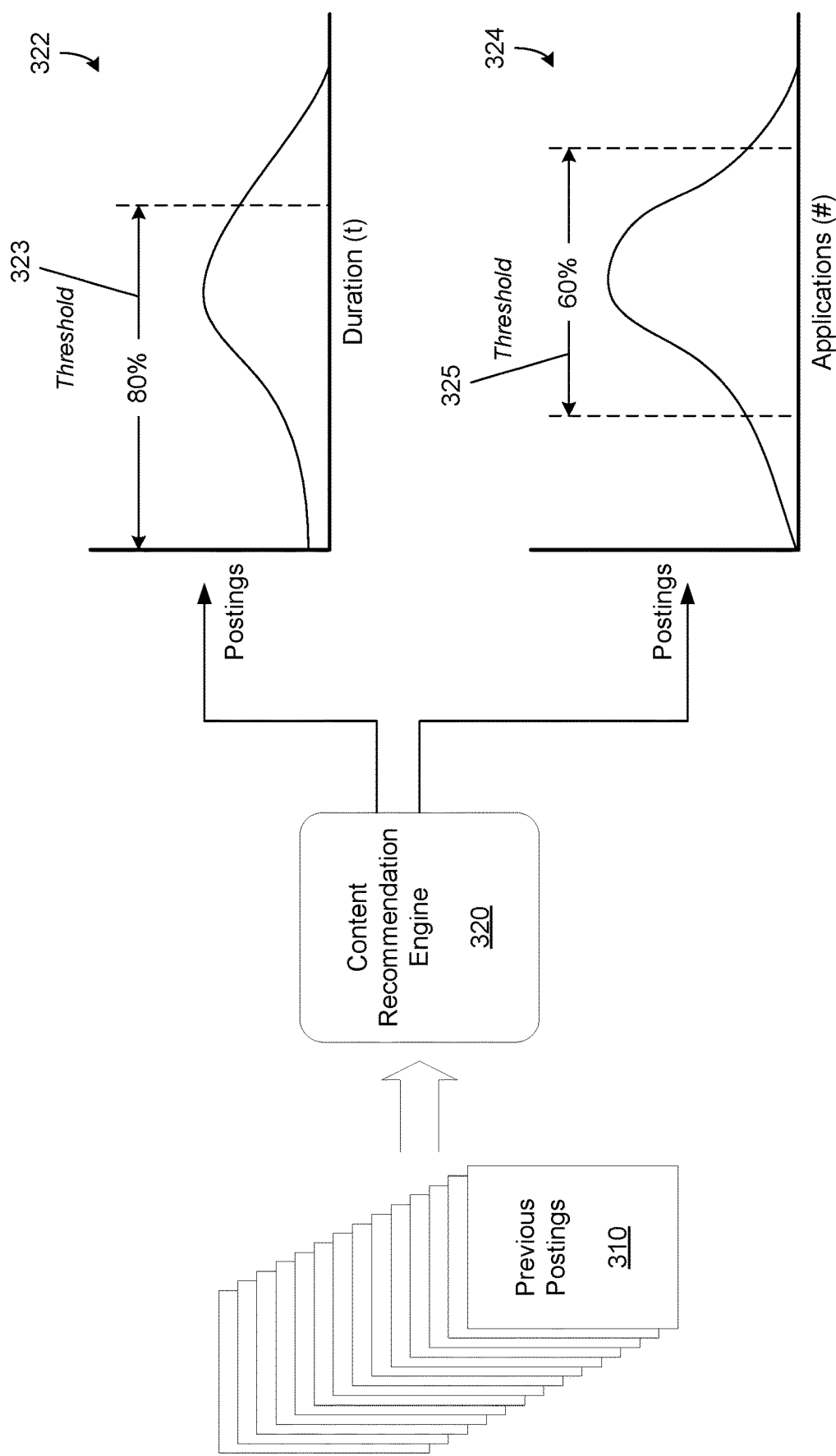

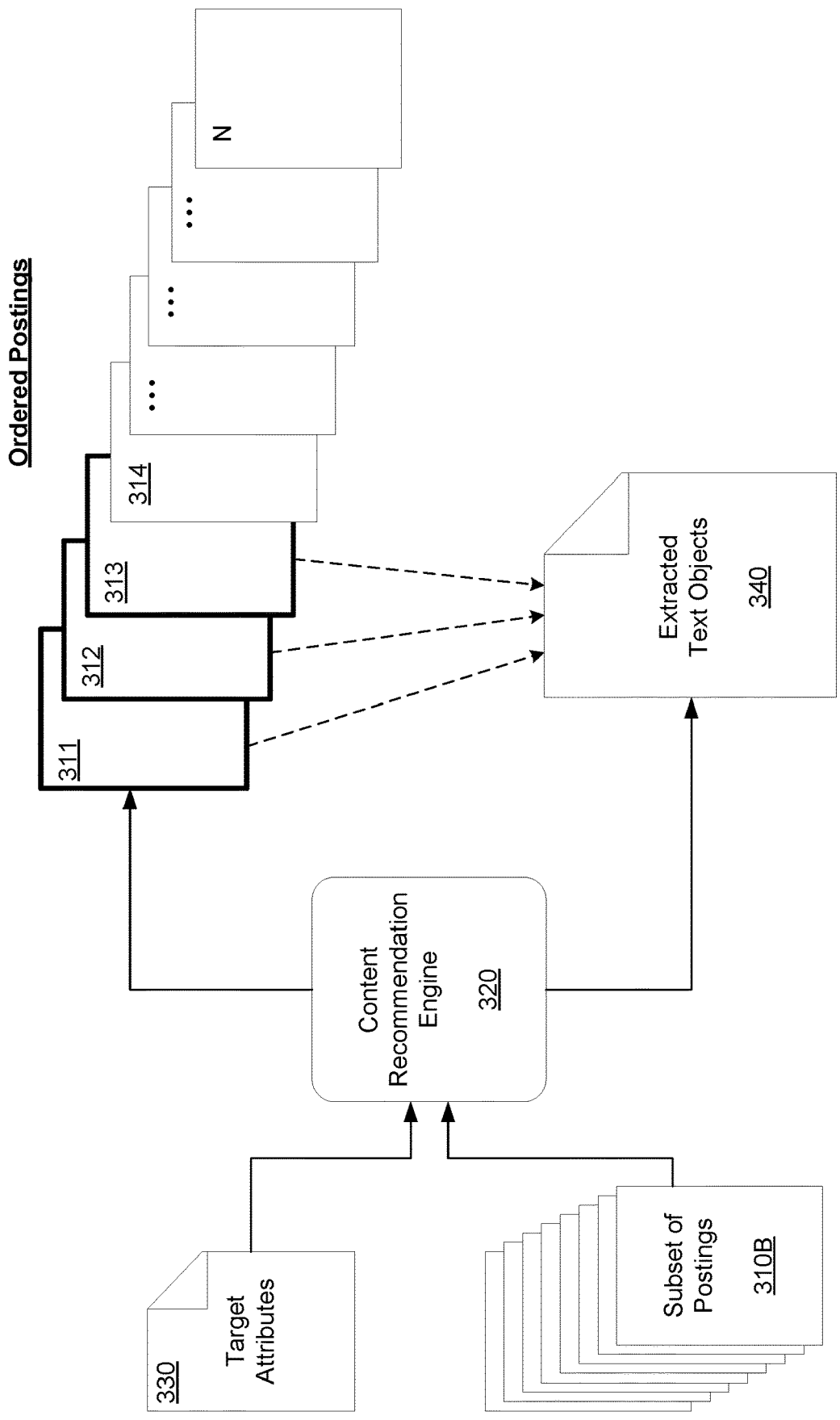

MACHINE-LEARNING CREATION OF JOB POSTING CONTENT

BACKGROUND

Hiring professionals often turn to the Internet when trying to attract new employees. One of the roles of the hiring professional is to create job postings which may be posted to online resources (websites, mobile apps, etc.). While the process of creating a job posting is rather simple, creating an effective job posting can be difficult. For a job posting to be successful, the job posting often requires a clear explanation of the job requirements and target attributes of the ideal candidate. However, in many cases, job postings include corporate jargon which prevents job seekers from understanding if they are qualified for the job opportunity. This leads many people to simply press a button and send their resume. As a result, a hiring professional may receive and must review a significant amount of unqualified candidates which creates delays in the overall hiring process.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a process of predicting target attributes for a new job posting in accordance with an example embodiment.

FIG. 3A is a diagram illustrating a process of filtering previous job postings in accordance with an example embodiment.

FIG. 3B is a diagram illustrating a process of ordering a subset of previous postings based on similarity to target attributes in accordance with an example embodiment.

Figure 1:
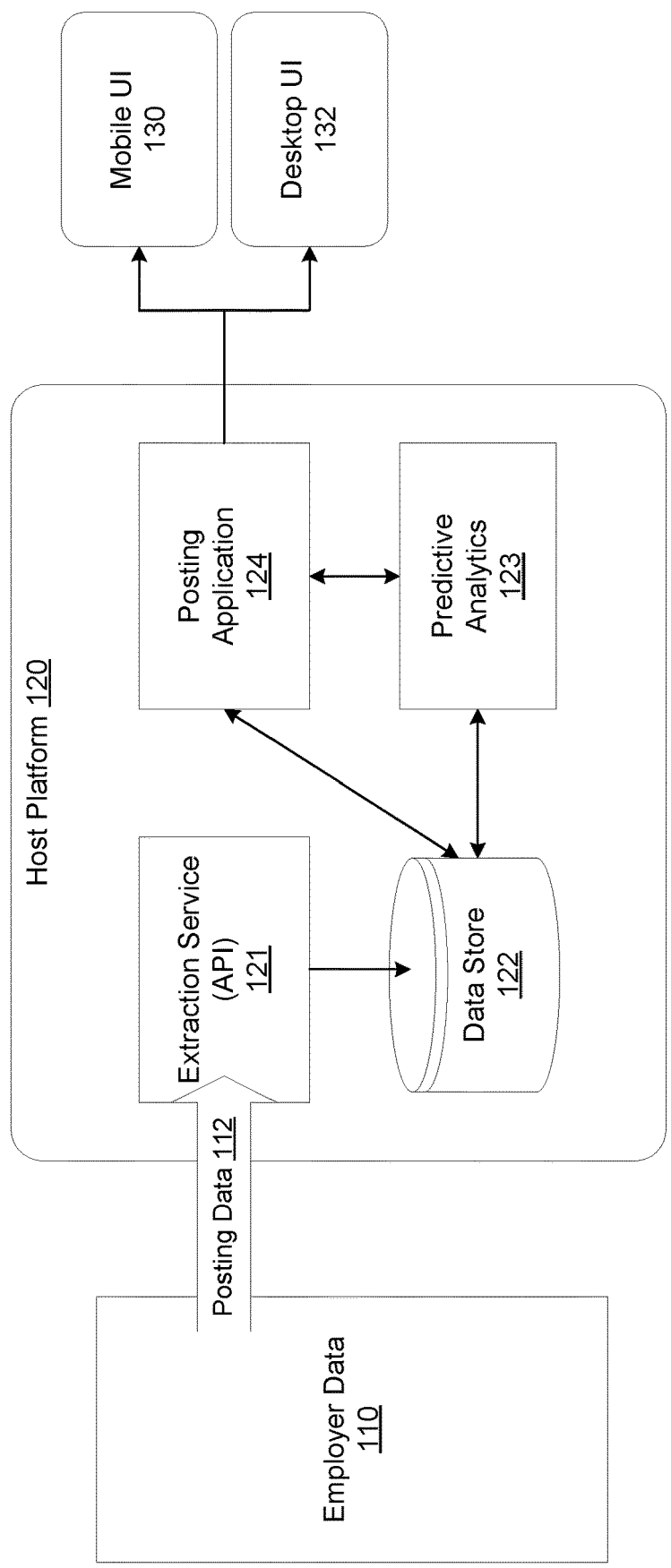
FIG. 1 is a diagram illustrating a computing environment for creating job posting content based on machine learning in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

In today's hyper competitive economy, organizations compete to hire the best talent. For hiring professionals, compelling job postings can lead to successful long-term employees. As described herein, a job posting includes an entry on an employment-based website. A job website is essentially a software application designed to allow employers to post job requirements for an open position to external or internal applicants. Through such a job website, a potential applicant can search through the job postings, drill into more information about the job posting, and even apply for a job posting and/or submit resumes for the advertised position. The best job postings are both efficient (open for a short duration) and prolific (create an adequate number of quality applicant responses). However, many postings suffer due to the content within the posting. For example, postings are not always clear as to the purpose and objective of the job, expectations and tasks of the job, the desired skills and competencies of the applicant (including educational requirements), work experience, and the like.

The system described herein overcomes these drawbacks by automatically suggesting content for a job posting. For example, the system may use machine learning to identify text content, image content, and the like, which is effective based on historical job postings of the organization. In addition, the system can also predict, via machine learning, a target set of attributes (attribute map) of an ideal candidate for a job opportunity based on qualifications/responsibilities of current employees with a similar position in the organization. Accordingly, the system described herein can support both a process of recommending target attributes for a candidate, and also a process of recommending text/image content for a job posting based on the target attributes.

According to various embodiments, an attribute recommendation engine can be used to define a set of criteria (attributes) and their values for the new team member. For example, the attribute recommendation engine may identify activities/tasks which should be performed by the candidate based on existing team members or other successful team members with similar profiles. The attribute recommendation engine may quantify a weight of the attributes for the entire team either by the engine or assessed by the manager. The attribute recommendation engine may analyze a distribution of each particular attribute within the same profile, calculating total values for each attribute to reflect the desired skills balance for the future, and generate the desired set of target attributes and weights based on the rebalanced attribute values.

In addition, the example embodiments also provide a content recommendation engine that can be used to recommend content for inclusion in a new job posting based on historical content in previous successful postings. The content recommendation engine may remove unsuccessful postings and outlier postings from the previous postings of the company to generate a subset of successful postings. The target attributes (also referred to herein as an attribute map) of a candidate for a new posting can be identified with the help of machine learning (e.g., unsupervised learning, clustering algorithms, etc.) or provided manually. The content recommendation engine may then identify similar previous postings based on the attribute map, and extract content (text objects, images, etc.) from the similar postings, and output them for display.

Based on the recommendations made, a hiring professional incurs a head start on the job posting creation process. For example, the content recommendation engine may output text in the form of words, phrases, terms, sentences, and other grammatical objects which are recommended for inclusion in the new job posting. In addition, the content recommendation engine may output images, links to web content, links to videos, and the like, which may also help describe the job, and influence potential candidates.

FIG. 1 illustrates a computing environment 100 for creating job posting content based on machine learning in accordance with an example embodiment. The computing environment 100 is merely for purposes of example, and should not be construed as limiting the architecture of a host platform for the job posting software described herein.

Referring to FIG. 1, the computing environment 100 includes an employer database 110 which stores historical job posting information which may include text content of job postings, image content of job postings, durations of postings, number of responses to postings, and the like. The job postings may include text content that is in an unstructured format such as blobs of text, or the like. As another example, the job postings may include structured text content. The job postings may be historical/previous job postings that were used by hiring professionals within an organization to attract new employee/candidates to an open position. Other attributes that may be included within the job posting data include salary information, geographical locations of the postings, current performance data of the hires from the postings, content of the applicant responses to the job postings, and the like.

The computing environment 100 further includes a host platform 120 such as a server, a database, a cloud platform, or the like. The host platform 120 may host the content recommendation engine and the attribute recommendation engine in the form of posting application 124, or other services not shown. In this example, the host platform 120 may include an extraction service 121 which can retrieve or otherwise receive job posting data 112 from the employer database 110. Here, the extraction service 121 may include one or more application programming interfaces (APIs) for communicating with and identifying the necessary data from the customer data 110. The APIs may convert the raw employee data into a format that is in a format of a data store 122 where the retrieved data is stored. The data store 122 may include a relational database which stores the data in tabular format with columns and rows. However, the data store 122 is not limited to a relational database and may include any type of data store.

The host platform 120 may store and execute the procedural components (business rules) which may also include or otherwise control predictive analytics 123 which are accessible by the host platform 120. According to various embodiments, the predictive analytics 123 may use machine learning to predict target attributes of a candidate for a new job posting, and also predict job posting content that may be successful at attracting applicants in an efficient manner. The predictive analytics 123 may generate predictions from the posting data 112 retrieved from the data store 122. The predictive analytics 123 may include machine learning tools for supervised learning such as classification, regression, etc., and/or unsupervised learning tools such as clustering, etc. The host platform 120 may also include a posting application 124 which may include the logic for outputting the recommended target attributes and the recommended job posting content to a user interface such as a mobile user interface 130 and a desktop user interface 132.

The posting application 124 may include services that facilitate requests and response (e.g., HTTP, HTML, etc.) with client devices displaying one or more user interfaces 130 and 132 associated with the job posting application 124. In this example, the user interfaces 130 and 132 may provide a window or dashboard that allows hiring professional users the ability to view target attributes and recommended content for job postings. In some embodiments, the user interfaces 130 and 132 may also include a job posting builder which incorporate the recommendation engines described herein. Both the mobile UI 130 and the desktop UI 132 may be displayed on user devices such as mobile phones, laptops, desktops, servers, workstations, tablets, and the like.

FIG. 2 illustrates a process 200 of predicting target attributes 221-224 for a new job posting in accordance with an example embodiment. New employees may be needed for different reasons including replacing a previous employee, expansion/growth of the workforce to include a new employee, or even a completely new team of employees. Referring to FIG. 2, an attribute recommendation engine 220 can analyze employee data 210 to determine target attributes of a candidate who will be the subject of a new posting 205. Here, the new posting 205 information may include an identifier of a team, a job title, a listing of current employees on the same team or in the same area/field, and the like.

The attribute recommendation engine 220 may retrieve or otherwise receive employee data 210 associated with the new posting 205. For example, the employee data 210 may include job responsibilities of similar employees in the same team/field (specific) or job responsibilities of successful employees (generic). In case of a job posting of an existing team, how well the actual team performs may be considered. For example, if the team performance is good, the attribute recommendation engine 220 can stick to the responsibilities, attributes, etc., of the existing team and derive all attributes of the new candidate from it. As another example, if the team performs insufficiently, the attribute recommendation engine 220 may be given another successful team with a similar activity profile and derive the attributes from there. Here, the performance may be determined based on job performance ratings, reviews, current manager notes, etc.

In an example in which the current team is performing well, the attribute recommendation engine 220 can use its activities for further analysis. The team may have one or many activity profiles. For example, for a software development team, the team data may contain the following activity profiles: quality assurance (QA) specialist, delivery specialist, developers, UX designer, and the like. Each profile may require just a single person (e.g., a QA specialist). In this case, the attribute recommendation engine 220 can collect required attributes directly from the profile. However, team members usually have blurred or mixed responsibilities within the team. Thus, the attributes needed from the job candidate may be difficult to acquire with just a glance. In other words, each team member may have multiple activities/responsibilities.

The attribute recommendation engine 220 unfolds to its full extent for team members with a similar profile. Continuing with the example of a software developer, the profile of the team may be broken down to analyze the team strengths and weaknesses and try to find a job candidate that fits them as best as possible. Examples of software developer attributes can include one or more of creating of the new code, refactoring of the existing code, code reviews, development documentation on Wiki, Github, etc., testing, technical support (bug fixing), customer engagement (roll-in and roll-out), self-learning, and the like.

For the attribute recommendation engine 220, attributes (also referred to as activities, duties, responsibilities, tasks, etc.) can be quantified. Other attributes which the engine cannot quantify, can still be assessed by the hiring manager based on his experience. For example, the attribute recommendation engine 220 may assign weights to attributes for the entire team which can be calculated by the attribute recommendation engine 220 or assessed/provided by a hiring manager. For example, the weights of the attributes can be evaluated by statistical (e.g. machine learning) algorithms based on the employee data 210 (such as software commits in the example of the software developer).

The next step for the attribute recommendation engine 220 is to analyze the distribution of each particular attribute within the same profile (here, developers). In FIG. 2, a plurality of attributes 221-224 are shown for the team and charts are shown with arrows and bold to indicate a contribution of the team member being replaced. In this example, employee data 210 may be analyzed to determine each of the attributes 221-224, as well as contributions of each of the current members to the attributes (represented by the charts). Based on the calculated contribution, the attribute recommendation engine 220 can create a profile for a new posting (for a software developer position, etc.) broken down into the set of attributes 221-224 and their importance which is represented by weights 231-234, respectively. Here, the attributes 221-224 may correspond to an attribute map that may be input into a content recommendation engine as shown in the examples of FIGS. 3A-3B.

In the examples herein, the target attributes may correspond to a skill set required for the exact replacement of a departing member. However, as another example, a hiring manager may want to rebalance the team, e.g. to free up some team players from the routine tasks. This manual rebalancing may affect the team performance, in a positive but also in a negative way. However, the attribute recommendation engine 220 may calculate total values for each attribute and the hiring manager can manually change the values of the existing team members in order to reflect the desired skills balance for the future.

The attribute recommendation engine 220 can calculate the desired profile based on the rebalanced attribute values. In an example of adding an additional team member, the attribute recommendation engine 220 may consider the hiring reasons changing current attributes/responsibilities of existing team members, hiring a new candidate to perform a specific task that is newly created, hiring a new candidate to respond to an increased demand/load on a team, and the like. In some embodiments, a hiring manager may adjust a team skillset required for the task manually. As another example, the attribute recommendation engine 220 may calculate gaps between the existing team members a derive an optimal set of attributes. As another example, the attribute recommendation engine 220 may analyze how the skills are clustered between the members and select a skill cluster with the minimal distance to the "median of all skills" (i.e. an average software developer). This task of clustering and skillset selection mostly closed to the average can be done by machine learning algorithms.

FIG. 3A illustrates a process 300A of filtering previous job postings 310 in accordance with an example embodiment, and FIG. 3B illustrates a process 300B of determining a similarity of previous postings to target attributes in accordance with an example embodiment. Referring to FIG. 3A, a content recommendation engine 320 may retrieve previous job postings 310 of an organization. Initially, the previous job postings 310 may not be specific to a target job posting. Instead, the previous postings 310 may be generic to all job postings.

The process 300A may perform a filtering operation to remove less successful job postings. Here, success may be a product of efficiency. For example, a job posting may be considered a success if the posting attracted the "right" number of applicants. Meanwhile, a job posting that includes a broad or vague description might cause too many unqualified applicants to apply causing a strain on the hiring staff (e.g., number of interviews, number of rejections, etc.). Meanwhile, a job posting that includes a very specific/narrow description may not receive enough job applicants, or any applicants at all. Other measures of success may include a job posting that attracted the best applicant in terms of team fit and growth potential. Furthermore, a job posting is successful if the job posting is consistent with the subsequent job offer (the job offer contains the details of the offer of employment including salary, benefits, job title, other terms and conditions of employment) and allows the selected candidate to sign the employment contract.

In the example of FIG. 3A, two different criteria are used to filter out job postings that are less successful from job postings that are more successful. For example, processing duration (how long the job remained open and accepting applicants) may be used as a criteria when determining the success of a job posting. As another example, the number of applications received may be used as another criteria when determining the success of a job. In the process 300A, the content recommendation engine 320 may create a chart 322 which maps postings over a duration. Here, threshold percentage of postings may be captured as successful. As a non-limiting example, a threshold 323 is equal to 80% of the duration. Therefore, job postings that are completed in the top 80% of all postings are considered a success, while job postings in the bottom 20% may be filtered out/removed. The threshold 323 may be changed to any desired ratio.

As another example, the content recommendation engine 320 may create a chart 324 which maps postings to number of applicants received in response. Here, another threshold percentage 325 may be used to identify successful postings. In this example, a successful posting doesn't include too little applications or too many applications. Therefore, the threshold 325 identifies a middle portion (middle 60%) of the postings which correspond to the successful postings and removes postings with too little number of applicants and too many applicants. Again, the threshold can be changed to include any desired number. Both processing duration and number of applications may be used to filter the job postings to generate a reduced subset of job postings. As another example, only one of process duration and number of applications may be used to filter job postings. Furthermore, although not shown in FIG. 3A, other criteria such as whether the job posting was a success (measured on various criteria such as how long the eventual hire stayed with the organization, meet or exceeded expectations, etc., may be used.

Referring to FIG. 3B, the content recommendation engine 320 may identify a smaller set of previous postings 310B (resulting from the filtering in FIG. 3A), which most closely match target attributes 330 of the candidate that is the subject of the new posting. The target attributes (also referred to as an attribute map) may be determined by the process 200 in FIG. 2. As another example, the target attributes may be entered manually by a user/hiring professional. From the rest of postings (after applying the "success" filter), machine learning algorithms may be applied to identify which previous postings are most closely related to the target attributes of the new posting. For example, each of the previous postings being considered may be converted by the content recommendation engine 320 into an attribute map. However, for each attribute, the content recommendation engine may maintain a reference to the original posting part (phrase, tag, image, etc.). For images, the content recommendation engine 320 may encode the existence of a visual object as a Boolean by setting a variable (e.g., SectionX.visualObject=true).

Based on machine learning and statistical algorithms, the content recommendation engine 320 may identify a small portion of the subset of previous postings 310B that most closely match the target attributes 330. For example, the subset of previous postings may be ordered based on how closely each posting matches the target attributes 330. The dimensions of the machine learning/model may include the attributes as features. The machine learning model may select previous postings with a minimum or least distance to the attribute map of the target attributes 330. In some embodiments, the machine learning models may consider weights assigned to each of the target attributes 330 when identifying the closeness of each previous posting, such as the weights 231-234 shown in FIG. 2. Next, the content recommendation engine 320 may select a threshold amount of the most closely matching ordered postings.

For example, in FIG. 3B, the most closely matched posting 311 is followed by posting 312, posting 313, posting 314, to posting N. Here, the content recommendation engine 320 may take the top three postings (postings 311, 312, and 313). The number of matched postings may be configured (e.g. 5% of all postings but not less than 10%, etc.).

Figure 4:
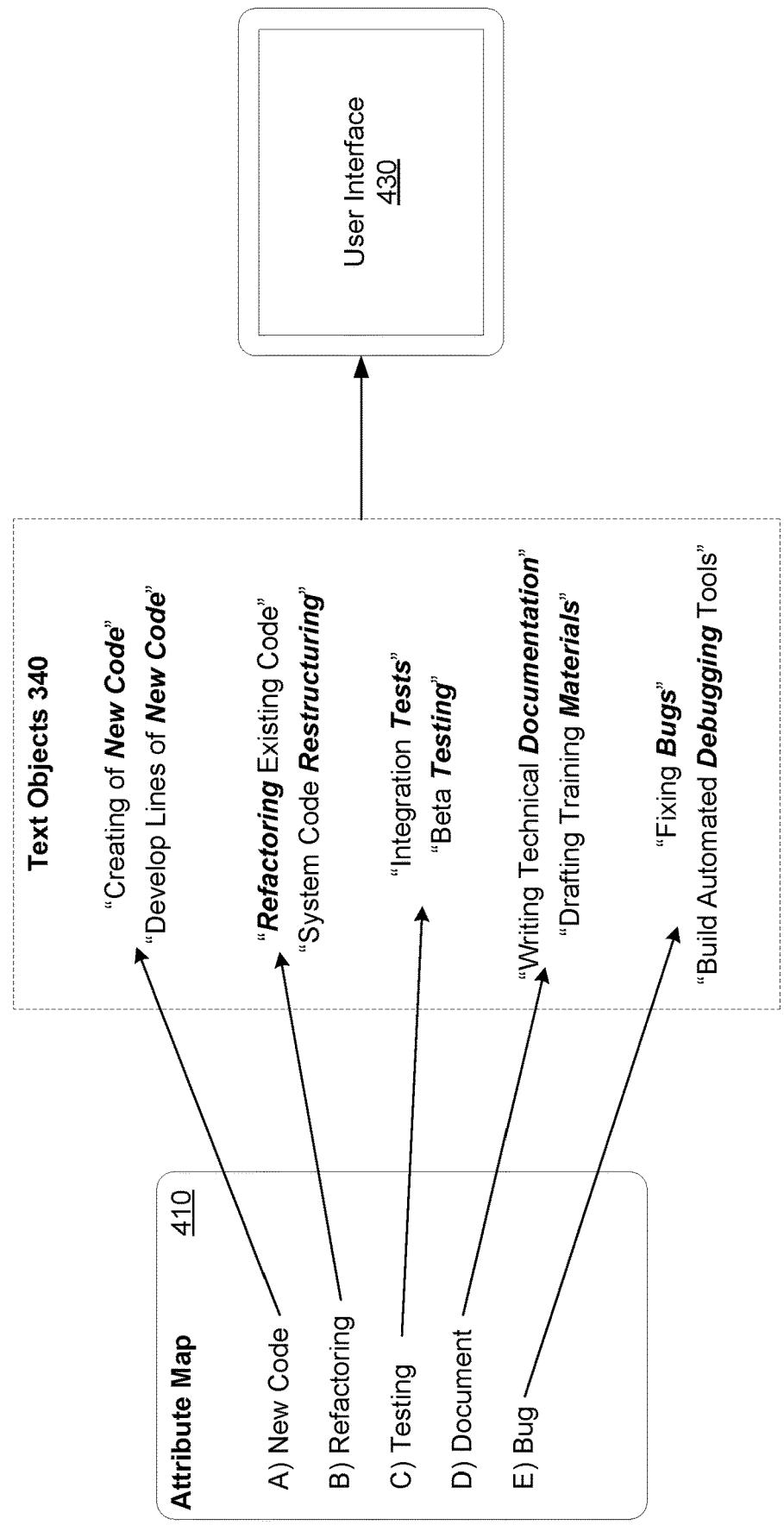
FIG. 4 is a diagram illustrating a process of extracting text objects from previous postings in accordance with an example embodiment.

Referring to FIGS. 3B and 4, for the matched postings, the content recommendation engine 320 may "deformalize" the attribute map (e.g., attribute map 410 shown in FIG. 4) of the matched postings back to the original values. For texts, phrases may be deformalized and for images the real images may be deformalized. Finally, the content recommendation engine 320 may extract text objects 340 from the deformalized matched postings, and return or otherwise display a list of proposed objects 340 (phrases, tags, images) that had the best application rate (in terms of processing time and number of applications). Here, the text objects 340 may include sentences or phrases with exact matches to target attributes, or similarities with target attributes. For example, the target attribute refactoring may be similar to "restructuring," etc. The text objects 340 may be output via a user interface 430 such as the mobile UI 130 or the desktop UI 132 shown in the example of FIG. 1.

Figure 5:
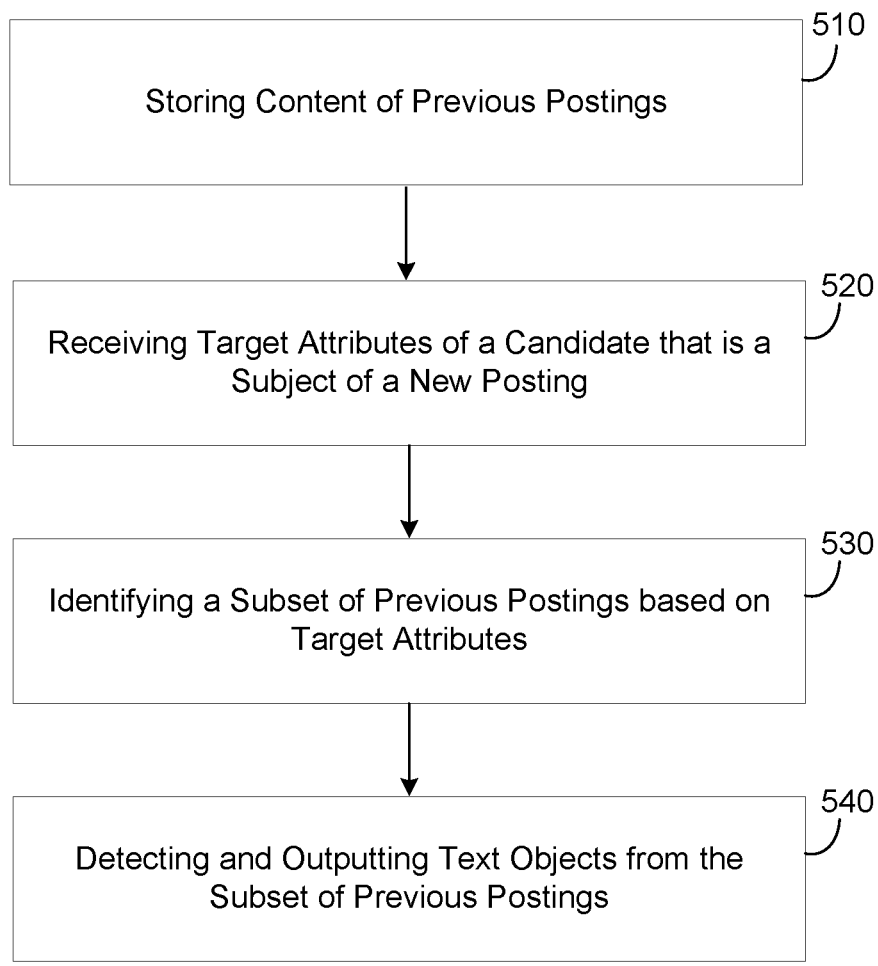
FIG. 5 is a diagram illustrating a method of generating content for a job posting in accordance with an example embodiment.

FIG. 5 illustrates a method 500 a method of generating text content for a job posting in accordance with an example embodiment. For example, the method 500 may be performed by a service, an application, or other program that is executing on a host platform such as a database node, a cloud, a web server, an on-premises server, another type of computing system, or a combination of devices/nodes.

Referring to FIG. 5, in 510, the method may include storing content of previous postings. For example, the content may include text content, image content, and the like, of previous job postings that were used by an organization. The previous postings may include text content that is in an unstructured format. To make the data more efficient for predictive analytics/statistical analytics, the previous postings may be converted into attribute maps which include a listing of target attributes within the text content of the postings. Each posting may have its own attribute map. Accordingly, the attribute recommendation engine and the content recommendation engine described herein may perform statistical analysis and predictions based on the attribute maps instead of the raw text content.

In 520, the method may include receiving target attributes of a candidate that is a subject of a new posting. Here, the target attributes may be received from a user (manually input) through one or more fields of a user interface. As another example, the target attributes may be received from another software program or generated internally by the software program performing the method of FIG. 5.

In 530, the method may include identifying, via a machine learning model, a subset of previous postings from among the previous postings which are most closely related to the new posting based on the target attributes of the candidate with respect to content of the previous postings. For example, the method may identify a small subset of postings (e.g., 5-10%, etc.) that are most closely related to the target attributes of the new job posting based on attribute maps of the subset of postings with respect to the target attributes. In 540, the method may include detecting text objects from the identified subset of previous postings and outputting a display of the detected text objects.

Although not shown in FIG. 5, in some embodiments, the method may further include removing previous postings based on processing duration of the previous postings to generate filtered postings, and identifying the subset of previous postings from the filtered postings. As another example, the method may further include removing previous postings based on a number of applications received with respect thereto to generate filtered postings, and identifying the subset of previous postings from the filtered postings. In some embodiments, the identifying may include ordering the previous postings, via the machine learning, from most closely matching to least closely matching with respect to the target attributes, and selecting a threshold number of the ordered postings as the subset of previous postings.

In some embodiments, the method may further include predicting, via a second machine learning model, the target attributes of the candidate based on responsibilities of other users associated with the new posting. In some embodiments, the method may further include weighting the predicted target attributes with respect to each other based on missing attributes of the other users, wherein the identifying is performed based on the weighted target attributes. In some embodiments, the outputting may include extracting text segments from the identified subset of previous postings and outputting the extracted text segments to a user interface. In some embodiments, the identifying may further include identifying, via the machine learning model, one or more images related to the new posting based on the target attributes of the candidate, and outputting the image with the detected text objects.

Figure 6:
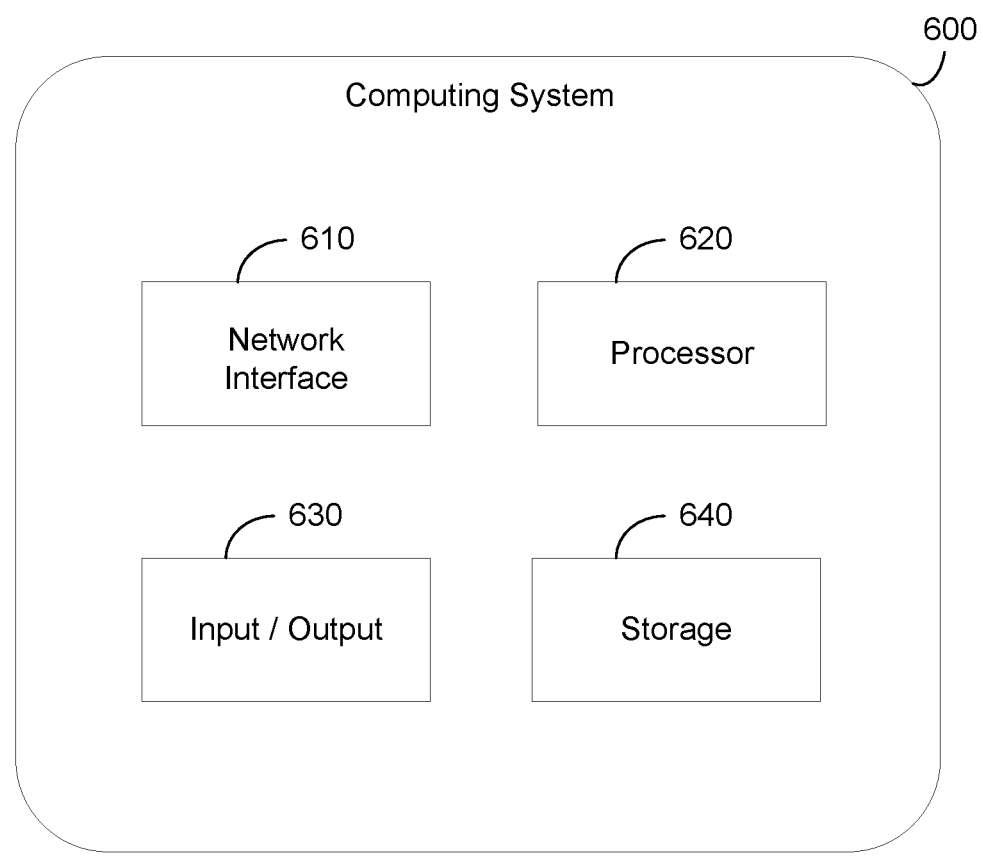
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, a user device, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. Here, the data store may store parity data in columnar fashion. Therefore, the storage 640 may be used to store database objects, records, items, entries, and the like, associated with job postings.

According to various embodiments, the storage 640 may be configured to store text content (and image-related content) of previous postings. For example, the text content may include job descriptions, job postings, etc. The processor 620 may receive target attributes of a candidate that is a subject of a new posting, identify, via a machine learning model, a subset of previous postings from among the previous postings which are most closely related to the new posting based on the target attributes of the candidate with respect to content of the previous postings, and detect text objects from the identified subset of previous postings and outputting a display of the detected text objects.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a storage configured to store text content of previous postings from one or more online resources; and
    a processor configured to:
        receive target attributes of a candidate that is a subject of a new posting;
        determine, via a recommendation engine, weights for the target attributes based on a distribution of the target attributes within the previous postings;
        identify, via a machine learning model, a subset of previous postings from among the previous postings which are most closely related to the new posting based on the target attributes of the candidate with respect to the text content of the previous postings, wherein the machine learning model identifies the subset of the previous postings based on the weights for the target attributes determined by the recommendation engine; and
        identify text from the identified subset of previous postings and display, via the user interface, the identified text as a recommendation for the new posting.

2. The computing system of claim 1, wherein the processor is further configured to filter the previous postings based on processing duration of the previous postings to generate filtered postings, and identify the subset of previous postings from the filtered postings.

3. The computing system of claim 1, wherein the processor is further configured to filter the previous postings based on a number of applications received with respect thereto to generate filtered postings, and identify the subset of previous postings from the filtered postings.

4. The computing system of claim 1, wherein the processor is further configured to arrange the previous postings in an order from most closely matching to least closely matching with respect to the target attributes via execution of the machine learning model, and select a threshold number of the ordered postings as the subset of previous postings.

5. The computing system of claim 1, wherein the processor is further configured to predict, via a second machine learning model, the target attributes of the candidate based on responsibilities of other users associated with the new posting.

6. The computing system of claim 5, wherein the processor is further configured to weight the predicted target attributes with respect to each other based on missing attributes of the other users, and identify the subset of previous postings based on the weighted target attributes.

7. The computing system of claim 1, wherein the processor is configured to extract text segments from the identified subset of previous postings and output the extracted text segments via the user interface.

8. The computing system of claim 1, wherein the processor is configured to identify, via the machine learning model, one or more images related to the new posting based on the target attributes of the candidate, and output the image with the detected text objects.

9. A method comprising:
    storing text content of previous postings from one or more online resources;
    receiving target attributes of a candidate that is a subject of a new posting;
    determining, via a recommendation engine, weights for the target attributes based on a distribution of the target attributes within the previous postings;
    identifying, via a machine learning model, a subset of previous postings from among the previous postings which are most closely related to the new posting based on the target attributes of the candidate with respect to the text content of the previous postings, wherein the machine learning model identifies the subset of the previous postings based on the weights for the target attributes determined by the recommendation engine; and
    identifying text from the identified subset of previous postings and displaying, via the user interface, the identified text as a recommendation for the new posting.

10. The method of claim 9, further comprising filtering the previous postings based on processing duration of the previous postings to generate filtered postings, and identifying the subset of previous postings from the filtered postings.

11. The method of claim 9, further comprising filtering the previous postings based on a number of applications received with respect thereto to generate filtered postings, and identifying the subset of previous postings from the filtered postings.

12. The method of claim 9, wherein the identifying comprises arranging the previous postings in an order from most closely matching to least closely matching with respect to the target attributes via execution of the machine learning model, and selecting a threshold number of the ordered postings as the subset of previous postings.

13. The method of claim 9, further comprising predicting, via a second machine learning model, the target attributes of the candidate based on responsibilities of other users associated with the new posting.

14. The method of claim 13, further comprising weighting the predicted target attributes with respect to each other based on missing attributes of the other users, wherein the identifying is performed based on the weighted target attributes.

15. The method of claim 9, wherein the displaying comprises extracting text segments from the identified subset of previous postings and outputting the extracted text segments via the user interface.

16. The method of claim 9, wherein the identifying further comprises identifying, via the machine learning model, one or more images related to the new posting based on the target attributes of the candidate, and outputting the image with the detected text objects.

17. A non-transitory computer-readable medium storing instructions which when executed by a processor cause a computer to perform a method comprising:
    storing text content of previous postings from one or more online resources;
    receiving target attributes of a candidate that is a subject of a new posting;
    determining, via a recommendation engine, weights for the target attributes based on a distribution of the target attributes within the previous postings;
    identifying, via a machine learning model, a subset of previous postings from among the previous postings which are most closely related to the new posting based on the target attributes of the candidate with respect to the text content of the previous postings, wherein the machine learning model identifies the subset of the previous postings based on the weights for the target attributes determined by the recommendation engine; and
    identifying text from the identified subset of previous postings and displaying, via the user interface, the identified text as a recommendation for the new posting.

18. The non-transitory computer-readable medium of claim 17, wherein the method further comprises filtering the previous postings based on processing duration of the previous postings to generate filtered postings, and identifying the subset of previous postings from the filtered postings.

19. The non-transitory computer-readable medium of claim 17, wherein the method further comprises filtering the previous postings based on a number of applications received with respect thereto to generate filtered postings, and identifying the subset of previous postings from the filtered postings.

20. The non-transitory computer-readable medium of claim 17, wherein the method further comprises predicting, via a second machine learning model, the target attributes of the candidate based on responsibilities of other users associated with the new posting.

* * * * *